United States Patent [19]

Hildebrandt

[11] 4,050,841

[45] Sept. 27, 1977

[54] POWER BORING BITS

[75] Inventor: William J. Hildebrandt, West Simsbury, Conn.

[73] Assignee: The Stanley Works, New Britain, Conn.

[21] Appl. No.: 666,783

[22] Filed: Mar. 15, 1976

[51] Int. Cl.² .............................................. B23B 51/00
[52] U.S. Cl. .................................. 408/213; 145/116 R
[58] Field of Search ................ 408/200, 201, 211, 212, 408/213, 214, 144, 713; 145/116 R

[56] References Cited

U.S. PATENT DOCUMENTS

| 2,576,376 | 11/1951 | Wilson | 408/213 |
|---|---|---|---|
| 2,577,987 | 12/1951 | Wilson | 408/213 |

FOREIGN PATENT DOCUMENTS

| 202,791 | 8/1923 | United Kingdom | 145/116 R |

Primary Examiner—Othell M. Simpson
Assistant Examiner—Z. R. Bilinsky

[57] ABSTRACT

A power boring bit is fabricated from a shaft member and a disc which has a channel extending from the circumference thereof to a coaxial aperture through which the shaft extends. The shaft has a pointed tip portion at one end which provides cutting surfaces extending from the point of the tip portion and circumscribing a circle of rotation of maximum radius. A generally axially extending planar shoulder portion is provided on the tip portion with the radial distance to the shoulder portion being less than the maximum radius. One edge portion of the disc bounding the channel is bent to extend from the plane of the body of the disc towards the point and thereby define a cutting lip portion which has a free end providing a cutting edge extending from the periphery of the disc to closely adjacent the axial shoulder portion intermediate the width thereof and inwardly of the circle of rotation of maximum radius.

20 Claims, 14 Drawing Figures

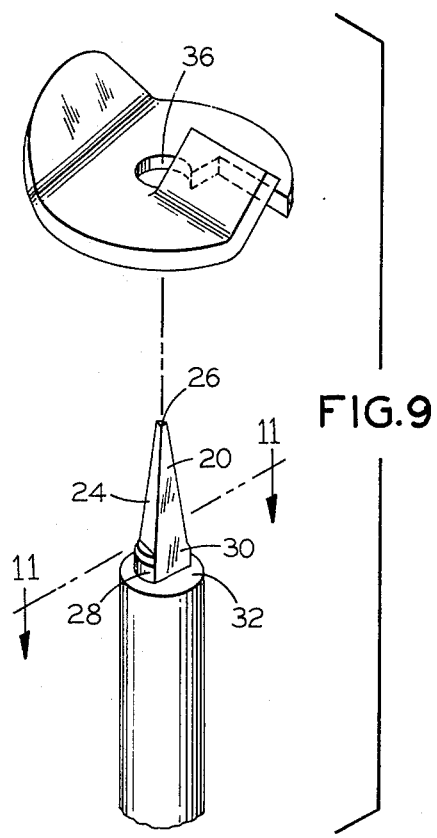
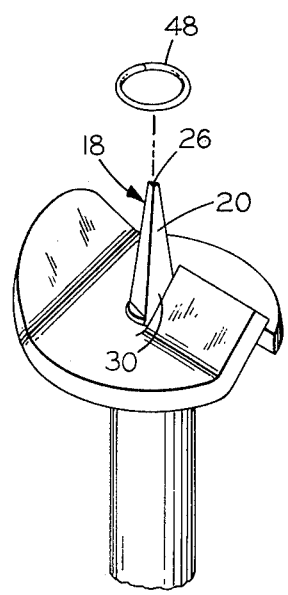
FIG.9
FIG.10
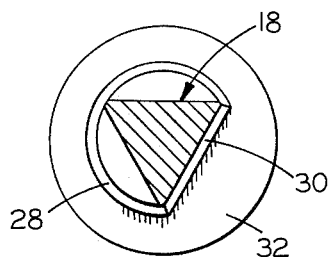
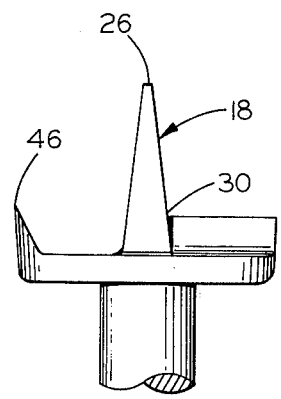
FIG.11
FIG.4
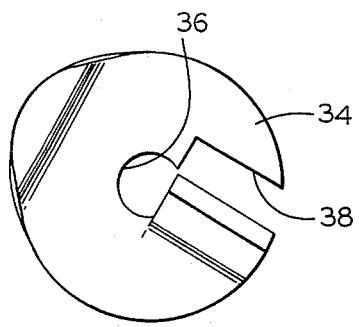
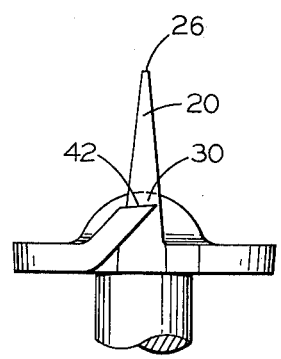
FIG.8
FIG.5

POWER BORING BITS

BACKGROUND OF THE INVENTION

Power boring bits are widely employed for rapid drilling of medium to large size holes in wood, plastic and the like. Over the years, various techniques have been proposed for assembling a separately formed disc to an elongated shank or bit providing the pointed tip portion. Illustrative of various structures are those shown in Wilson U.S. Pat. Nos. 2,576,376 granted Nov. 27, 1951, 2,577,987 granted Dec. 11, 1951 and 2,593,823 granted Apr. 22, 1952; De Liso Pat. No. 2,962,066 granted Nov. 29, 1960; and Mackey Pat. No. 3,165,131 granted Jan. 12, 1965.

It has been recognized that significant economic advantages could be obtained by the use of cutting discs which might be formed from sheet metal stock by suitable punching, machining and grinding operations. Among the problems that have been encountered in fabricating and assembling such composite power boring bits have been obtaining a satisfactory bond between the two components to prevent relative displacement, locating the cutting edge of the disc relative to the cutting edge of the point, providing adequate means for removal of the turnings, and achieving satisfactory transition of the cutting edge action from the point to the disc.

It is an object of the present invention to provide a novel power boring bit which is fabricated relatively economically and relatively easily from rod or bar stock for the shaft member and from sheet stock for the disc member.

It is also an object to provide such a power boring bit wherein the disc member is securely engaged to the shaft member in a manner substantially ensuring against relative displacement.

Another object is to provide such a power boring bit in which there is achieved smooth transition between the cutting action provided by the point and the cutting action provided by the disc.

SUMMARY OF THE INVENTION

It has now been found that the foregoing and related advantages may be readily attained in a power boring bit which includes a shaft member having an elongated shank portion and a pointed tip portion at one end thereof configured to provide cutting surfaces along a segment of its axial length extending from the point of the tip portion. The cutting surfaces circumscribe a circle of rotation of maximum radius at a location along the length of the tip portion which is spaced from the point thereof, and the tip portion has a generally axially extending planar shoulder portion spaced from the point with the radial distance to the shoulder portion being less than the maximum radius. Seated on the tip portion at the axial shoulder portion is a cutter disc having an aperture therethrough and a channel therein extending from the aperture to the circumference thereof. One edge portion of the disc bounding the channel is bent so as to extend at an angle from the plane of the body of the disc toward the point of the tip portion to provide a cutting lip portion and the free end of this cutting lip portion has a cutting edge extending from the periphery of the disc to closely adjacent the axial shoulder portion of the tip portion intermediate the width thereof and inwardly of the circle of rotation of maximum radius. Suitable means is employed to bond the disc to said tip portion.

In the preferred aspect, the tip portion is of lesser cross section at its base than the shank portion to provide a radial shoulder thereabout with the body of the disc abutting the radial shoulder. The aperture through said disc is of D-shaped configuration defined by a rectilinear portion and an arcuate portion extending between the ends of the rectilinear portion which is disposed adjacent the axial shoulder portion of the tip portion.

Depending upon the size of the components, the channel in the disc may extend perpendicularly to a horizontal line across the axial shoulder portion or at an acute angle thereto.

In one embodiment, the tip portion is of polygonal cross section throughout the segment of its axial length and the faces thereof defining the polygonal cross section taper towards the point. Desirably, the polygonal cross section is provided by a generally pyramidical configuration for the tip portion throughout the segment of its axial length. In this embodiment, the axial shoulder portion may be provided by a portion of one of the faces of the polygon, and the cutting surfaces are defined by the corners of the polygon with the cutting edge of the cutter disc intersecting one face of the polygon adjacent the midpoint of the width thereof.

In another embodiment, the axial shoulder portion is provided by a flat encompassing only a portion of the periphery of the tip portion, and extending at an angular orientation relative to the axis of the tip portion differing from that of the remainder of the periphery at the location of the flat. Here, the tip portion may be of polygonal cross section throughout the segment of its axial length and the faces thereof defining the polygonal cross section taper towards the point. The flat then has an included angle greater than that of the face of the polygon aligned therewith. Using the separate flat is essential when the tip portion has a helical thread providing the cutting surfaces.

The means bonding the disc to the tip portion will normally comprise a metallic deposit such as brazing metal, although other means may be used such as welding, pins, etc.

Most desirably, the cutter disc includes a spur formed at a point about the periphery spaced from the cutting lip portion and extending from the face of the disc disposed towards the point of the tip portion.

In a method for making the power boring bits, an elongated shaft member is formed with a shank portion and a pointed tip portion at one end thereof with cutting surfaces extending along a segment of the axial length of the tip portion from the point thereof and circumscribing a circle of rotation of maximum radius at a location along the length of the tip portion spaced from the point thereof. The tip portion is formed to provide a generally axially extending planar shoulder portion spaced from the point with the radial distance to the axial shoulder portion being less than the maximum radius. A disc is formed with a coaxial aperture and a channel extending from its circumference to the aperture with the portion along one edge of the channel extending at an angle from the plane of the body of the disc to provide a cutting lip portion. The disc is then seated on the tip portion of the shaft member with the cutting lip portion projecting in the direction of the point and having its inner end disposed closely adjacent the axial shoulder portion intermediate the width thereof and inwardly of the circle of rotation of maximum radius. Then the disc is bonded to the tip portion.

As indicated hereinbefore, the cutting lip portion may be ground to provide a cutting edge along the free end thereof extending from the periphery of the disc to closely adjacent the axial shoulder portion of the lip portion. The coaxial aperture in the disc may be formed with a rectilinear side edge and an arcuate side edge extending between the ends of the rectilinear side edge, and the channel then intersects the rectilinear edge intermediate the ends thereof. The disc is assembled to the tip portion with the rectilinear side edge of the aperture disposed against the axial shoulder portion.

The disc may comprise a sheet metal blank and the forming operations are conveniently performed by stamping and punching. The disc may be initially stamped from sheet metal to provide the coaxial aperture and a rib extending from the periphery thereof to the aperture, and a portion of the rib may thereafter be removed to provide the cutting lip portion and a cutting edge thereon.

Most desirably, the tip portion is formed with a base of lesser cross section than the adjacent portion of the shank so as to provide a radial shoulder thereabout, and the disc is seated firmly against this radial shoulder.

BRIEF DESCRIPTION OF THE DRAWINGS

FIG. 4 is a fragmentary elevational view to an enlarged scale of the side opposite that in FIG. 1;

FIG. 5 is another similar elevational view with the bit rotated 90° in a clockwise direction;

FIG. 8 is a plan view to an enlarged scale of the disc in the embodiment of FIG. 2;

FIG. 9 is a partially exploded view to an enlarged scale of the disc and a fragmentary portion of the shaft of the embodiment of FIGS. 1 and 2;

FIG. 10 shows the disc assembled to the shaft of FIG. 9 and the brazing ring prior to assembly thereof;

FIG. 11 is a sectional view along the line 11—11 of FIG. 9;

DETAILED DESCRIPTION OF THE ILLUSTRATED EMBODIMENTS

Figure 1:
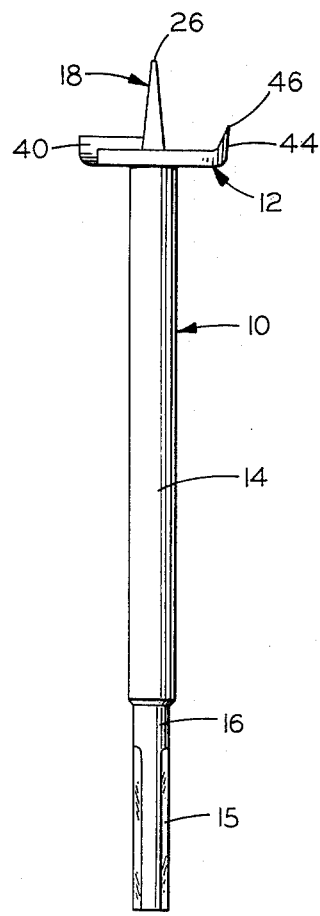
FIG. 1 is an elevational view of a power boring bit embodying the present invention.

Turning first to FIG. 1 of the drawings, a power boring bit embodying the present invention is comprised of an elongated shaft element generally designated by the numeral 10 and a cutter disc element generally designated by the numeral 12 which is mounted upon the shaft element 10 and secured thereto in a manner which will be described in detail hereinafter.

In the embodiments of FIGS. 1–11, the shaft element 10 has an elongated shank 14 with a reduced diameter portion 16 at one end thereof which is provided with flats 15 for seating in the chuck of a drill or brace (not shown). At the other end of the shank 14 is the pointed tip portion portion generally designated by the numeral 18 having a substantially pyramidical cutting portion defined by three triangular faces 20, 22, 24 which taper to a substantial point 26 from the pedestal portion 28. As seen, the pedestal portion 28 is of generally D-shaped cross section with the projection of the pyramid face 20 providing the straight side of the D-shaped cross section and thereby forming a generally axially extending planar shoulder 30 along the portion thereof adjacent the shank 14 and including the pedestal portion 28. In this embodiment, wherein the cross section is that of an equilateral triangle, the edges provided by the intersection of the faces 20, 22, 24 provide the cutting edges of the tip portion 18. As best seen in FIGS. 9 and 11, the pedestal portion 28 is of lesser radial dimension than the shank 14 so as to provide a radial shoulder 32 thereabout.

Figure 2:
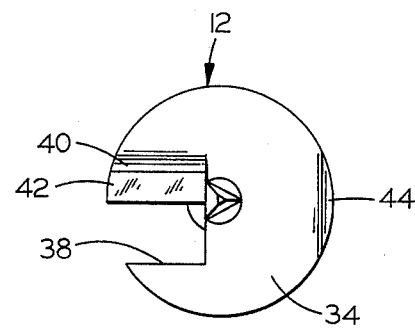
FIG. 2 is a plan view to an enlarged scale of the bit of FIG. 1 showing one embodiment thereof with the cutting lip portion extending perpendicularly to a horizontal line across said axial shoulder portion.

Turning now to the cutter disc embodiment of FIGS. 2 and 8, the cutter disc 12 is conveniently formed by stamping and punching from sheet metal so as to provide a generally planar body 34 with a generally D-shaped aperture 36 coaxially therethrough and a substantially rectilinear channel 38 extending from the periphery to the rectilinear edge of the aperture 36. In this embodiment, the edges of the channel extend perpendicularly to a horizontal line across the axial shoulder 30 or axial plane befined by the base thereof. Depending upon dimension of the parts, one edge thereof may extend radially in the pure geometric sense. A portion of the metal of the disc 12 adjacent the channel 38 is deformed in the direction of the point 26 to provide a cutting lip portion 40 and the free end thereof is ground to provide a cutting edge 42. As best seen in FIG. 2, the cutting edge 42 thus extends from the periphery of the disc 12 and intersects the face 20 of the tip portion 18 intermediate the side edges thereof.

Spaced substantially diametrically from the lip portion 40 is a spur portion 44 which projects from the body 34 in the same direction as the cutting lip portion 40 along a chord generally perpendicular to an imaginary line defined by an axial plane bisecting the face 20 of the tip portion 18. As best seen in FIG. 1, the free end of the spur portion 44 is ground to provide a cutting edge 46.

Figure 3:
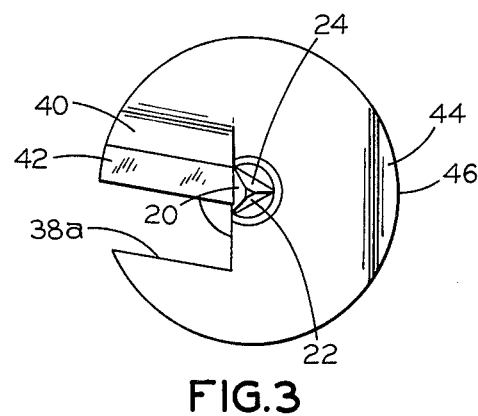
FIG. 3 is a view similar to FIG. 2 but showing a larger disc embodiment with the cutting lip portion extending at an acute angle to a horizontal line across said axial shoulder portion.
Figure 7:
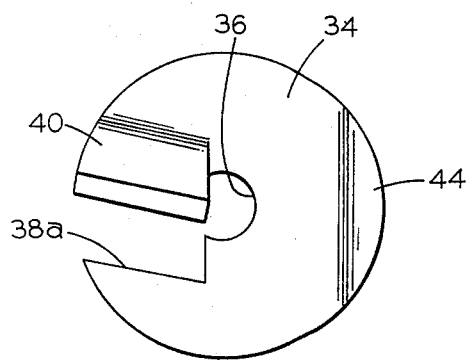
FIG. 7 is a plan view to an enlarged scale of the disc in the embodiment of FIG. 3.

In the embodiment of FIGS. 3 and 7, the rectilinear channel 38a extends at an acute angle to a horizontal line drawn across the axial shoulder 30 or the axial plane defined by the base thereof. This embodiment is generally employed with discs 12 (and tip portions 18) of larger dimensions in order to ensure that the inner end of the cutting edge 42 is disposed closely adjacent the axial shoulder 30.

In fabricating and assembling the embodiments of FIGS. 1–11, rod stock is machined or otherwise formed to provide the shaft element 10 with the reduced portion 16 and chucking flats 15 and the pointed tip portion 18 with the radial shoulder 32 extending thereabout. Most conveniently, the end providing the pointed tip portion 18 is initially machined to provide the pedestal portion 28 and radial shoulder 32 thereabout and then the faces 20, 22, 24 are ground to provide the cutting edges.

In accordance with one technique in part illustrated in FIG. 10, a sheet metal disc is stamped and punched to provide the D-shaped aperture 36 and the rectilinear channel 38 in its desired location. The punching and stamping operation may concurrently deform into the desired orientation the spur portion 44 and the cutting lip portion 40, or these may be formed as part of separate operations. The cutter disc 12 is then assembled on the shaft element 10 so that it bears firmly against the radial shoulder 32 with the rectilinear side of the D-shaped aperture 36 being disposed adjacent the face 20 and axial shoulder portion 30 of the tip portion 18 as seen in FIGS. 9 and 10. After proper orientation of the cutter disc 12 upon the shaft element 10, a ring 48 of brazing material is disposed at the juncture between the disc 12 and tip portion 18 and this assembly is heated to cause the brazing compound to flow along the interfaces thereof and firmly bond the elements in assembly. After heat treatment, the periphery of the disc 12 is ground concentrically about the shaft element 12, and thereafter the spur portion 44 and cutting lip portion 40 are ground.

Figure 6:
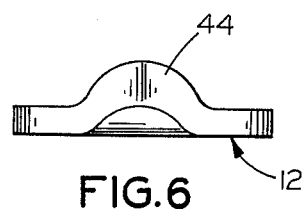
FIG. 6 is a side elevational view of a disc formed in one technique of manufacture prior to grinding.

In another technique for forming the cutter disc 12, the disc blank may initially be stamped to form the spur portion 44 into the configuration seen in FIG. 6. In this manner, grinding time to form the cutting edge 46 thereon may be reduced.

Figure 12:
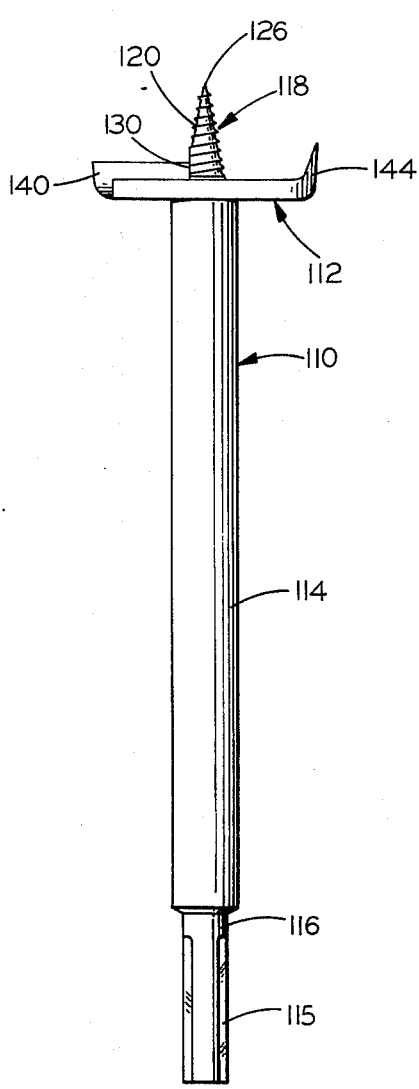
FIG. 12 is an elevational view of another embodiment of power bore bit using a helical thread to provide the cutting edges of the tip portion.
Figure 13:
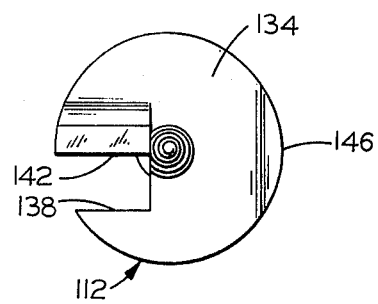
FIG. 13 is a plan view of the embodiment of FIG. 12.
Figure 14:
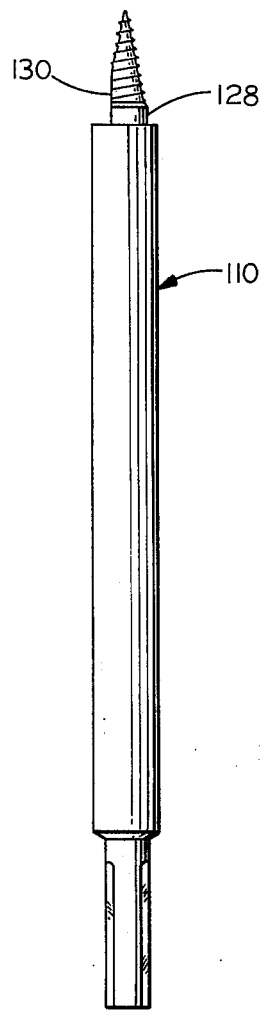
FIG. 14 is a fragmentary elevational view to an enlarged scale of the tip portion of the embodiment of FIG. 12 showing the flat providing the axial shoulder thereof.

Turning now to the embodiment of FIGS. 12–14, the shaft element generally designated by the numeral 110 has a shank 114 and reduced portion 116 with chucking flats 115 as in the embodiment of FIG. 1. However, in this embodiment, the pointed tip portion generally designated by the numeral 118 is provided with a helical thread 120 of generally increasing diameter from the point 126 thereof, and the edges of the helical thread provide the cutting edges of the tip portion 118. As best seen in FIGS. 13 and 14, the tip portion 118 is machined or ground to provide a generally axially extending planar shoulder portion 130 extending from the pedestal portion 128 towards the point 126.

The cutter disc generally designated by the numeral 112 is formed similarly to that of the embodiment of FIGS. 1–11 with the same reference numerals being employed except in the 100 series. It is assembled to the shaft element 110 and secured thereon in a like manner.

In each of the several embodiments, it can be seen that the pointed tip portion 18, 118 defines a circle of rotation having a maximum radius spaced from its point 26, 126. The cutting lip portion 40, 140 is bent upwardly from the plane of the body 34, 134 of the cutter disc 12, 112 and disposed so that the inner end of the cutting edge 42, 142 is closely adjacent the axial shoulder portion 30, 130 and intermediate the side faces therewith. In the embodiment of FIGS. 1–11, it can be seen that the three corners of the pyramid shaped tip portion 18 define the circle of rotation and that the disposition of the inner end of the cutting edge 42 intermediate the width of the face 20 locates it inwardly of the maximum radius circle of rotation of the cutting edges. As a result, the cutting edges defined by the intersections of the pyramidical faces 20, 22, 24 bore an aperture having a radius larger than the radial distance to the inner end of the cutting edge 42. Thus, the effective portion of the cutting edge 42 begins at a point spaced slightly from the axial shoulder portion 30 and the tendency for clogging and poor cutting action at the juncture of the two distinct cutting edges is avoided.

Similarly, in the embodiment of FIGS. 12–14, the flat providing the axial shoulder portion 130 permits the cutting edge 142 to extend inwardly of the maximum diameter of the helical thread 120.

In either embodiment, the radial distance to the midpoint of the axial shoulder portion 30 (or the point of alignment with the inner end of the disc cutting edge 42, 142) is less than the radial distance to the cutting edge of the tip portion 18, 118 at that axial location. As used herein, the terminology "radial distance to the axial shoulder portion" refers to this radial distance; and the terminology "circle of rotation of maximum radius" refers to the circle circumscribed by the cutting edges of the pointed tip portion at this axial distance along the length of the tip portion.

In operation of the embodiment of FIGS. 1–11, the pyramidical pointed tip portion 18 begins the cutting action and provides a pilot hole of expanding diameter as it penetrates into the workpiece. It can be seen that the corners between faces of the pyramid provide the cutting edges. As the bit penetrates into the workpiece to a depth where the tip 46 of the spur 44 contacts the workpiece, it begins to cut the fibers or material of the workpiece, and then the full width of the cut is effected by the cutting edge 42 of the disc 12 as it rotates about the hole cut by the tip portion 18. Since the inner end of the cutting edge 42 is disposed inwardly of the circle of rotation of maximum radius of the tip portion 18, it can be seen that there is no discontinuity of cutting action at the inner end of the cutting edge 46. Moreover, since the end is disposed close to the axial shoulder portion 30, there is relatively little opportunity for chips of material of the workpiece to become entrapped therebetween. As the chips of material are cut from the workpiece, they flow upwardly through the channel 38.

In operation of the embodiment of FIGS. 12–14, the helical thread or auger tip portion 118 similarly provides a pilot hole of expanding diameter as it penetrates into the workpiece with the chips being channeled along the helical thread 120. The inner end of the cutting edge 142 of the disc 112 extends to a point closely adjacent the axial shoulder 130 and is obviously within the circle of rotation of maximum radius defined by the tip portion 118. As a result, the cutting edge 142 cuts highly effectively from the hole provided by the tip portion 118 to its outer end and, as in the case of the previous embodiment, there is little tendency for chips or turnings to catch in the area between the lip portion 140 and axial shoulder 130.

As will be appreciated from the specifically illustrated embodiments, the tip portion may have either a polygonal configuration or a helical thread configuration of the auger type. Of the possible polygonal configurations wherein the corners defined by the faces of a polygon of increasing cross sectional area provide the effective cutting edges, a triangular cross section (and a pyramidical configuration) have proven most effective. Of the various triangular cross sections which are possible, an equilateral triangle is preferred because all cutting edges are effectively cutting.

As is seen from the embodiment of FIGS. 1–11, it is not necessary to mill or machine a separate flat to provide the axial shoulder portion when the tip configuration has a polygonal cross section. The desired planar surface may simply result from the included angle, or angle of taper, of the tip portion. Moreover, it will be appreciated that when a flat is employed, it need not extend across the entire width of the face of that side of the polygon but a groove or other similar area of sufficient width to permit the cutting lip to slide into position and the cutting edge to extend inwardly of the circle of maximum rotation may be effectively employed.

As has been hereinbefore indicated, the disc is conveniently punched and stamped from sheet metal and the same punching operation may punch out the central aperture and the channel extending from the circumference to the central aperture. The forming tools may be designed to bend both the spur portion and the cutting lip portion upwardly into the desired angular orientation. As has been indicated, a rib may be stamped to extend from the circumference to the central aperture, and the channel and the cutting edge may then be formed concurrently by the machining or grinding operation which removes the undesired metal and forms the cutting edge at the same time. Although the grinding operations forming the cutting edges on the spur and on the cutting lip portion may be effected prior to assembly upon the shaft, generally it is desirable to effect the final grinding operations after assembly to minimize the likelihood of possible damage to the edges during the assembly and brazing operations.

As indicated with respect to the two embodiments, the angular orientation of the cutting edge relative to the planar shoulder will vary depending upon the size or diameter of the cutting disc in order to maintain the inner end of the cutting edge on the disc closely adjacent the surface of the shoulder. With the smaller size discs requiring a relatively small vertical displacement of the cutting edge from the body of the disc, the cutting lip portion may be bent along a line which is perpendicular to a horizontal line drawn across the width of the planar shoulder, and the inner end of the cutting edge will still lie closely adjacent the planar shoulder, or so close that brazing compound may effectively fill the gap therebetween if so desired. As the diameter of the disc increases and the amount of vertical displacement of the cutting lip portion accordingly increases, it is desirable to bend the cutting lip portion along an angle to the horizontal line across the face of the planar shoulder. As a result, the inner edge will still be located closely adjacent the planar shoulder portion on the cutting tip. It is generally preferable to use the perpendicular orientation when possible so as to minimize stresses occuring at the juncture between the cutting lip portion and the body of the disc.

The configuration of the central aperture in the cutting disc may vary depending upon the cross section of the tip portion about which it will seat. Although it is possible to use any configuration from circular to polygonal, the preferred configuration is that illustrated which provides a straight side to facilitate locating of the disc against the planar shoulder and an arc extending from the ends of the rectilinear portion which blends smoothly thereinto to eliminate stress points. By providing at least one rectilinear segment for the opening, any tendency for the disc to rotate about the tip portion is effectively eliminated. By use of the rectilinear side for the aperture, it can be seen that the formation of the cutting lip portion is also facilitated in addition to providing the means for effecting the desired orientation of the disc upon the tip portion of the shank.

To limit the possibility for displacement of the disc relative to the shank and facilitate proper disposition of the disc along the length of the tip portion, a radial shoulder is desirably provided on the shank at the end of the tip portion. In assembly the disc upon the tip portion, the disc will then seat against the radial shoulder and a relatively extended surface area is provided for bonding between the tip portion and the shank.

Various techniques may be employed for assembling the disc to the shank including pinning, welding, adhesives, brazing and the like. Brazing is preferred since it minimizes the heat required for the assembly operation and thereby possible effects upon the properties of the metals employed. A ring of brazing material such as shown in FIG. 10 is conveniently utilized with the brazing material flowing about the interface between the disc and shank to provide a firm bond therebetween.

From the foregoing detailed specification and attached drawings, it can be seen that the power boring bit of the present invention may be fabricated relatively economically and relatively easily from rod or bar stock to provide the shaft member and from sheet stock to provide the disc member. The configuration of the present invention permits the disc member to be engaged securely to the shaft member in a manner which substantially ensures against relative displacement, and there is achieved a highly smooth transition between the cutting action provided by the tip portion and the cutting action provided by the disc. The method of assembly permitted by the present invention affords versatility in the design and dimension of the components as well as economy and facility in fabrication and assembly operations.

Having thus described the invention, I claim:
1. A power boring bit comprising:
    a. a shaft member having an elongated shank portion and a pointed tip portion at one end thereof configured to provide cutting surfaces along a segment of its axial length extending from the point of said tip portion, said cutting surfaces circumscribing a circle of rotation of maximum radius at a location along the length of said tip portion spaced from said point thereof, said tip portion having a generally axially extending planar shoulder portion spaced from said point with the radial distance to said shoulder portion being less than said maximum radius, said shoulder portion having a length dimension extending axially of said shaft member and a width dimension extending perpendicularly to said length dimension;
    b. a cutter disc having a planar body portion and a centrally disposed aperture therethrough receiving and extending about said tip portion at said axial shoulder portion, said cutter disc having a channel therein extending from the circumference thereof to said centrally disposed aperture therethrough, one edge portion bounding said channel extending at an angle from said plane of said body portion of the disc toward said point of said tip portion to provide a cutting lip portion with a root end adjacent said body portion of said disc and a free end spaced therefrom towards said point, said free end of said cutting lip portion having a cutting edge extending from the periphery of said disc to closely adjacent said axial shoulder portion of said tip portion intermediate the width of said axial shoulder portion and inwardly of the circle of rotation of maximum radius; and c. means bonding said disc to said tip portion.

2. The power boring bit in accordance with claim 1 wherein said tip portion is of lesser cross section at its base than the shank portion to provide a radial shoulder thereabout, and wherein said plane of said body portion of said cutter disc is substantially perpendicular to the axis of said shaft member, the body portion of said disc abutting said radial shoulder.

3. The power boring bit in accordance with claim 1 wherein said aperture through said disc is defined by a rectilinear portion and an arcuate portion extending between the ends of said rectilinear portion, said rectilinear portion being disposed adjacent said axial shoulder portion.

4. The power boring bit in accordance with claim 1 wherein said channel in said disc extends radially.

5. The power boring bit in accordance with claim 1 wherein said channel in said disc extends secantally.

6. The power boring bit in accordance with claim 1 wherein said tip portion is of polygonal cross section throughout said segment of its axial length and the faces thereof defining said polygonal cross section taper towards said point.

7. The power boring bit in accordance with claim 6 wherein said tip portion is of generally pyramidical configuration throughout said segment of its axial length.

8. The power boring bit in accordance with claim 6 wherein said axial shoulder portion is provided by a portion of one of the faces of the polygon and said cutting surfaces are defined by the corners of said polygon, said cutting edge of said cutter disc intersecting one face of the polygon adjacent the midpoint of the width thereof.

9. The power boring bit in accordance with claim 1 wherein said axial shoulder portion is provided by a flat encompassing only a portion of the periphery of said tip portion, said flat extending at an angular orientation relative to the axis of said tip portion differing from that of the remainder of the periphery at the location of said flat.

10. The power boring bit in accordance with claim 9 wherein said tip portion is of polygonal cross section throughout said segment of its axial length and the faces thereof defining said polygonal cross section taper towards said point, said flat having an included angle greater than that of the face of the polygon aligned axially therewith.

11. The power boring bit in accordance with claim 9 wherein said tip portion has a helical thread providing said cutting surfaces.

12. The power boring bit in accordance with claim 1 wherein said means bonding said disc to said tip portion comprises a metallic deposit.

13. The power boring bit in accordance with claim 1 wherein said cutter disc includes a spur formed at a point about the periphery of said disc spaced from said cutting lip portion and extending from the face of said body portion of said disc disposed towards said point of said tip portion.

14. The power boring bit in accordance with claim 1 wherein said plane of said body portion of said disc is perpendicular to the axis of said shaft member.

15. A power boring bit comprising:
a. a shaft member having an elongated shank portion and a pointed tip portion at one end thereof of polygonal cross section along a segment of its axial length with the faces thereof defining said polygonal cross section tapering towards the point of said tip portion, the intersection of said faces of said polygon providing cutting surfaces circumscribing a circle of rotation of maximum radius at a location along the length of said tip portion spaced from said point thereof, said tip portion having a generally axially extending planar shoulder portion spaced from said point with the radial distance to said shoulder portion being less than said maximum radius, said shoulder portion portion having a length dimension extending axially of said shaft member and a width dimension extending perpendicularly to said length dimension, said tip portion being of lesser cross section at its base than the shank portion to provide a radial shoulder thereabout and said axial shoulder portion being located adjacent said radial shoulder;
b. a cutter disc having a planar body portion and a centrally disposed aperture therethrough receiving and extending about said tip portion at said axial shoulder portion with the body thereof abutting said radial shoulder, said cutter disc having a channel therein extending from the circumference thereof to said centrally disposed aperture therethrough, one edge portion bounding said channel extending at an angle from said plane of said body portion of the disc toward said point of said tip portion to provide a cutting lip portion with a root end adjacent said body portion of said disc and a free end spaced therefrom towards said point, said free end of said cutting lip portion having a cutting edge extending from the periphery of said disc to closely adjacent said axial shoulder portion of said tip portion intermediate the width of said axial shoulder portion and inwardly of the circle of rotation of maximum radius; and
c. means bonding said disc to said tip portion.

16. The power boring bit in accordance with claim 15 wherein said tip portion is of lesser cross section at its base than the shank portion to provide a radial shoulder thereabout, and wherein said plane of said body portion of said cutter disc is substantially perpendicular to the axis of said shaft member, the body portion of said disc abutting said radial shoulder, said cutting edge of said cutter disc intersecting said axial shoulder portion adjacent the midpoint of the width thereof.

17. The power boring bit in accordance with claim 16 wherein said axial shoulder portion is provided by a portion of one of the faces of the polygon.

18. The power boring bit in accordance with claim 15 wherein said aperture through said disc portion is defined by a rectilinear portion and an arcuate portion extending between the ends of said rectilinear portion, said rectilinear portion being disposed adjacent said axial shoulder portion, and wherein said cutter disc includes a spur formed at a point about the periphery of said disc spaced from said cutting lip portion and extending from the face of said body portion of said disc disposed towards said point of said tip portion.

19. The power bore bit in accordance with claim 15 wherein said tip portion is of generally pyramidical configuration throughout said segment of its axial length.

20. The power boring bit in accordance with claim 15 wherein said plane of said body portion of said disc is perpendicular to the axis of said shaft member.

* * * * *